United States Patent
Lee et al.

(10) Patent No.: US 11,566,128 B2
(45) Date of Patent: Jan. 31, 2023

(54) SOFT POLYOLEFIN RESIN COMPOSITION WITH IMPROVED DIRECT-CURRENT INSULATION CHARACTERISTICS AND ARTICLE MOLDED THEREFROM

(71) Applicant: HANWHA TOTAL PETROCHEMICAL CO., LTD., Seosan-si (KR)

(72) Inventors: Eunwoong Lee, Chungcheongnam-do (KR); BongSeock Kim, Chungcheongnam-do (KR); YongSung Chun, Chungcheongnam-do (KR)

(73) Assignee: HANWHA TOTAL PETROCHEMICAL CO., LTD.

( * ) Notice: Subject to any disclaimer, the term of this patent is extended or adjusted under 35 U.S.C. 154(b) by 269 days.

(21) Appl. No.: 17/087,771

(22) Filed: Nov. 3, 2020

(65) Prior Publication Data

US 2021/0130601 A1    May 6, 2021

(30) Foreign Application Priority Data

Nov. 6, 2019 (KR) .................. 10-2019-0140824

(51) Int. Cl.
*C08L 53/00* (2006.01)
*H01B 3/44* (2006.01)

(52) U.S. Cl.
CPC .............. *C08L 53/00* (2013.01); *H01B 3/441* (2013.01); *C08L 2203/20* (2013.01); *C08L 2205/025* (2013.01); *C08L 2205/03* (2013.01)

(58) Field of Classification Search
CPC ...... C08L 23/14; C08L 23/0869; C08L 23/16; C08L 53/00; C08L 23/0853; C08L 2205/03; C08L 2205/025
See application file for complete search history.

(56) References Cited

U.S. PATENT DOCUMENTS

| | | | |
|---|---|---|---|
| 2011/0110928 A1 | 5/2011 | Chamberlain et al. | |
| 2013/0344329 A1 | 12/2013 | Perego et al. | |
| 2014/0255692 A1 | 9/2014 | Perego | |

FOREIGN PATENT DOCUMENTS

| | | | | |
|---|---|---|---|---|
| CN | 104558845 A | * | 4/2015 | ............... B29B 9/06 |
| JP | H02-195603 A | | 8/1990 | |
| JP | H08-007653 A | | 1/1996 | |
| JP | 3424050 B2 | | 7/2003 | |
| JP | 2010265350 A | * | 11/2010 | |
| KR | 1998-0009364 A | | 4/1998 | |
| KR | 10-0246138 | | 3/2000 | |
| KR | 10-2010-0025211 A | | 3/2010 | |
| KR | 10-2011-0110928 A | | 10/2011 | |
| KR | 10-1299356 B1 | | 8/2013 | |
| KR | 10-2014-0040082 A | | 4/2014 | |
| KR | 10-2014-0053204 A | | 5/2014 | |
| KR | 10-2014-0102407 A | | 8/2014 | |
| KR | 10-1985611 | | 6/2019 | |
| KR | 2019-0074775 A | | 6/2019 | |
| WO | 2000-015713 A1 | | 3/2000 | |
| WO | 2013/030206 A1 | | 3/2013 | |
| WO | 2013/148028 A1 | | 10/2013 | |

OTHER PUBLICATIONS

European Search Report dated Mar. 1, 2021 issued for European counterpart, European Patent Application No. 20203545.7 (total of 6 pages).
Notice of Reasons for Refusal for corresponding Japanese Application No. 2020-183440 dated Nov. 30, 2021, with English translation (8 Pages).
Masato Asada, et al., "Electrical Conduction of High-Resistance Olefin-Based Polymer Films Introduced With Polar Groups", Journal of Electrical Society A, vol. 116, No. 12, pp. 1113-1120, 1996 (English abstract).

* cited by examiner

*Primary Examiner* — Mark S Kaucher
(74) *Attorney, Agent, or Firm* — Harness, Dickey & Pierce, P.L.C.

(57) ABSTRACT

A soft polyolefin resin composition and an article molded therefrom are provided. The polyolefin resin includes: (A) 50 to 95% by weight of an ethylene-propylene block copolymer obtained by polymerization of a propylene homopolymer or an ethylene-propylene random copolymer with an ethylene-propylene rubber copolymer in stages in reactors; (B) 4.8 to 40% by weight of an ethylene-α-olefin rubber copolymer; and (C) 0.2 to 10% by weight of a copolymer of ethylene and a polar monomer, based on the total weight of components (A) to (C). The glass transition temperature of the rubber component in the ethylene-propylene block copolymer appears at −60 to −40° C. when measured by a dynamic mechanical analyzer, the melt index of the polyolefin resin composition measured at 230° C. under a load of 2.16 kg is 0.5 to 20 g/10 minutes, and the glass transition temperature of the rubber component in the polyolefin resin composition appears at −60 to −40° C. when measured by a dynamic mechanical analyzer.

19 Claims, No Drawings ated.If the content of the rubber phase is large, there is a problem that the advantages of polypropylene, which have a significant impact on the mechanical properties of an electric cable, are compromised.

SOFT POLYOLEFIN RESIN COMPOSITION WITH IMPROVED DIRECT-CURRENT INSULATION CHARACTERISTICS AND ARTICLE MOLDED THEREFROM

CROSS REFERENCE TO RELATED APPLICATIONS

This application claims priority from Korean Patent Application No. 10-2019-0140824 filed Nov. 6, 2019, which is expressly incorporated herein by reference in its entirety.

BACKGROUND

Technical Field

The present invention relates to a soft polyolefin resin composition with improved direct-current (DC) insulation characteristics and an article molded therefrom. Specifically, the present invention relates to a soft polyolefin resin composition with improved DC insulation characteristics, which is excellent in thermal resistance and mechanical properties, and an article molded therefrom.

Related Art

In general, polypropylene resins are widely used in the products that require insulation characteristics at high voltages and high thermal resistance at the same time, such as packaging of major parts of electronic products, housings of electrical parts for automobiles, protection of major parts of electrical products, and surfaces of small heaters, by virtue of their excellent rigidity, high thermal resistance, high resistance to chemicals, and high insulation characteristics.

However, since polypropylene resins have high rigidity and stress whitening takes place upon vending, it is difficult for them to be applied to curved parts. Since they are vulnerable to external impacts and they are easily broken at low temperatures, it is difficult to install and use them in an outdoor environment or where a lot of bends exist.

In order to improve such disadvantages of polypropylene resins, an ethylene-propylene rubber copolymer (EPR), an ethylene-α-olefin rubber copolymer, an ethylene-propylene-diene rubber copolymer (EPDM), or the like is often mixed with them.

However, when the above-mentioned rubber copolymer is mixed with a polypropylene resin to improve the softness or impact resistance of the composition, phase separation may take place, thereby forming an interface between the polypropylene and the rubber, resulting in a deterioration in the electrical insulation characteristics or thermal resistance characteristics. Therefore, attention must be paid to the selection of the rubber component and the content thereof.

Meanwhile, attempts have been made to use linear low-density polyethylene (LDDPE) or high-density polyethylene (HDPE) instead of polypropylene resins or to use the same as crosslinked.

However, when a linear low-density polyethylene resin as crosslinked is used, a problem arises in that space charges that reduce the insulation performance of a DC insulator are accumulated by the crosslinking residues. Further, it is difficult for the crosslinked polymers to be recycled when they have finished their service lives. Thus, they must be incinerated or disposed of, or additional costs are to be incurred due to separate facilities required for recycling thereof. There are several disadvantages in that environmental contamination is likely to occur due to the crosslinked by-products generated in the crosslinking step, that a drying step of the product is further required in the case of moisture curing, and that the processability of the product is limited when the crosslinking is excessive due to the heat generated during extrusion.

Thus, research has been conducted to improve the insulation characteristics and electrical characteristics while securing the thermal resistance, softness, and impact resistance at low temperatures of a polyolefin resin composition.

International Publication No. 2013/148028 teaches the changes in alternating-current breakdown voltage with respect to the cooling rate when ethylene, α-olefin, EPDM, or the like is mixed with a polypropylene resin. But no attempt has been made to improve the thermal resistance and softness of the composition. International Publication No. 2014/029447 proposes a method for improving the DC dielectric breakdown strength by mixing nano-sized aluminum silicate fillers with a crosslinked polyethylene resin used as an insulator. But the crosslinked polyethylene resin composition is not excellent in thermal resistance and environmental friendliness.

In addition, in Japanese Patent No. 3424050, it has been attempted to improve the dielectric breakdown strength by adding a modified polyethylene resin containing a carboxyl group to a linear low-density polyethylene resin to form a DC insulator. In International Publication No. 2013/030206, it has been attempted to improve the DC insulation characteristics of a polypropylene resin with a nano-sized catalyst system. Korea Laid-open Patent Publication No. 2011-0110928 discloses a method of preparing an insulation material that has excellent volume resistivity and dielectric breakdown strength by mixing a polyethylene or polypropylene insulation resin with nano-sized inorganic particles (e.g., magnesium oxide, carbon, silicon oxide, titanium dioxide, and the like). However, this method has a disadvantage in that it is difficult to uniformly disperse the nano-sized particles in the polyolefin.

Korean Laid-open Patent Publication No. 2014-0040082 discloses a thermoplastic polymer material in which a propylene copolymer is mixed with a rubber phase made from an α-olefin comonomer to secure the softness thereof. However, if the content of the rubber phase is small, it is difficult to install an electric cable that comprises the polymer material as an insulation material since the softness of the polymer material is deteriorated. If the content of the rubber phase is large, there is a problem that the advantages of polypropylene, which have a significant impact on the mechanical properties of an electric cable, are compromised.

Korean Laid-open Patent Publication No. 2014-0102407 discloses a technique on an insulation material having improved insulation characteristics and being recyclable by adding an insulation fluid to polypropylene. Korean Laid-open Patent Publication No. 2014-0053204 discloses a technique on an insulation material that employs a polypropylene resin with an organic nucleating agent to reduce the crystal size. However, since a large amount of rubber is additionally compounded in order to resolve the problem of low flexibility caused by the high rigidity of polypropylene, the physical properties may be partially deteriorated due to nonhomogeneous compounding. The organic nucleating agent added to reduce the crystal size causes a cost increase and adverse effects. Thus, the use of polypropylene as an insulation material is in need of further improvements.

Korean Patent No. 246138 discloses a polypropylene resin composition composed of a polypropylene resin and an ethylene-propylene copolymer resin or an ethylene-α-olefin rubber copolymer. However, it is silent on the actual results of improvements in impact resistance at −40° C. If the content of the ethylene-propylene rubber or ethylene-α-olefin rubber mixed to secure softness increases, the tensile characteristics, mechanical properties, and heat deformation are severe.

Technical Problem to Solve

In order to solve the above problems, an object of the present invention is to provide a soft polyolefin resin composition, which is excellent in insulation characteristics, thermal resistance, and mechanical properties.

Another object of the present invention is to provide an article prepared from the polyolefin resin composition.

SUMMARY

According to an embodiment of the present invention to achieve the above object, there is provided a polyolefin resin composition, which comprises (A) 50 to 95% by weight of an ethylene-propylene block copolymer obtained by polymerization of a propylene homopolymer or an ethylene-propylene random copolymer with an ethylene-propylene rubber copolymer in stages in reactors; (B) 4.8 to 40% by weight of an ethylene-α-olefin rubber copolymer; and (C) 0.2 to 10% by weight of a copolymer of ethylene and a polar monomer, based on the total weight of components (A) to (C), wherein the glass transition temperature of the rubber component in the ethylene-propylene block copolymer appears at −60 to −40° C. when measured by a dynamic mechanical analyzer, the melt index of the polyolefin resin composition measured at 230° C. under a load of 2.16 kg is 0.5 to 20 g/10 minutes, and the glass transition temperature of the rubber component in the polyolefin resin composition appears at −60 to −40° C. when measured by a dynamic mechanical analyzer.

The ethylene-propylene block copolymer (A) may have a melting temperature (Tm) of 145 to 170° C.

The ethylene-propylene block copolymer (A) may have a melt index of 0.5 to 20 g/10 minutes when measured at 230° C. under a load of 2.16 kg.

When the ethylene-propylene block copolymer (A) is extracted at room temperature with a xylene solvent, the content of the rubber component extracted is 1 to 50% by weight, preferably 5 to 45% by weight.

Here, the intrinsic viscosity of the rubber component extracted with the xylene solvent the is 1.0 to 3.0 dl/g when measured in a decalin solvent at 135° C.

The ethylene-α-olefin rubber copolymer (B) may be at least one selected from the group consisting of an ethylene-propylene rubber, an ethylene-1-butene rubber, an ethylene-butylene rubber, an ethylene-1-pentene rubber, an ethylene-1-hexene rubber, ethylene-1-heptene rubber, ethylene-1-octene rubber, and an ethylene-4-methyl-1-pentene rubber.

The content of ethylene in the ethylene-α-olefin rubber copolymer (B) is 5 to 90% by weight, preferably 5 to 80% by weight.

The polar monomer in the copolymer of ethylene and a polar monomer (C) may comprise at least one polar group selected from the group consisting of an acetate group, an acrylate group, a carboxylate group, and a ketone group.

When the polyolefin resin composition according to an embodiment of the present invention is extracted at room temperature with a xylene solvent, the content of the rubber component extracted is 10 to 50% by weight, preferably 15 to 40% by weight.

Here, the intrinsic viscosity of the rubber component extracted with the xylene solvent is 1.0 to 3.0 dl/g when measured in a decalin solvent at 135° C.

The polyolefin resin composition according to an embodiment of the present invention may have a melting temperature (Tm) of 145 to 170° C.

The polyolefin resin composition according to an embodiment of the present invention may further comprise at least one additive selected from the group consisting of an antioxidant, a neutralizer, a UV stabilizer, a long-term heat stabilizer, a slip agent, an anti-blocking agent, a reinforcement, a filler, a weathering stabilizer, an antistatic agent, a nucleating agent, a pigment, and a dye.

Here, the content of the additive may be 0.5% by weight or less based on the total weight of the polyolefin resin composition.

According to another embodiment of the present invention, there is provided a polyolefin resin article molded from the polyolefin resin composition.

The polyolefin resin article according to an embodiment of the present invention may have a flexural modulus of 500 MPa or less and an Izod impact strength of 5 kgf cm/cm or more at −40° C.

The polyolefin resin article according to an embodiment of the present invention may have an elongation of 400% or more, and the elongation measured after the same specimen is heated at 135° C. for 10 days may be 75% or more relative to the initial (before heating) elongation.

The polyolefin resin article according to an embodiment of the present invention may have a volume resistivity of 1016 Ωcm or more, and the volume resistivity measured after the same specimen is heated at 135° C. for 10 days may be 1016 Ωcm or more.

The polyolefin resin article according to an embodiment of the present invention may have a DC dielectric breakdown strength of 100 kV/mm or more, and the DC dielectric breakdown strength measured after the same specimen is heated at 135° C. for 10 days may be 100 kV/mm or more.

The polyolefin resin article according to an embodiment of the present invention may be an insulator of a high-voltage power device.

Advantageous Effects of the Invention

The polyolefin resin composition according to an embodiment of the present invention is excellent in impact resistance, heat deformation resistance, and mechanical properties and is good in electrical properties, which makes it suitable as a direct current insulator. Since it is not cross-linked and thus recyclable, it is environmentally friendly.

DETAILED DESCRIPTION

Hereinafter, the present invention will be described in more detail.

The polyolefin resin composition according to an embodiment of the present invention comprises (A) 50 to 95% by weight of an ethylene-propylene block copolymer obtained by polymerization of a propylene homopolymer or an ethylene-propylene random copolymer with an ethylene-propylene rubber copolymer in stages in reactors; (B) 4.8 to 40% by weight of an ethylene-α-olefin rubber copolymer; and (C) 0.2 to 10% by weight of a copolymer of ethylene and a polar monomer, based on the total weight of components (A) to (C).

(A) Ethylene-Propylene Block Copolymer

The polyolefin resin composition according to an embodiment of the present invention comprises an ethylene-propylene block copolymer (A). Here, the ethylene-propylene block copolymer (A) is obtained by polymerization of a propylene homopolymer or an ethylene-propylene random copolymer with an ethylene-propylene rubber copolymer in stages in reactors.

For example, a polypropylene-based matrix of a propylene homopolymer or an ethylene-propylene random copolymer is first polymerized, followed by block copolymerization of an ethylene-propylene rubber copolymer to the polypropylene-based matrix, thereby producing an ethylene-propylene block copolymer (A) resin.

The ethylene-propylene block copolymer (A) may have a melting temperature (Tm) of 145 to 170° C. If the melting temperature is lower than 145° C., the thermal resistance is not sufficient, so that the resin may be deformed by heat and that the dimensions of a molded article may be altered. Thus, it is not suitable to be used for an electric device operated at high temperatures.

The ethylene-propylene block copolymer (A) may have a melt index of 0.5 to 20 g/10 minutes when measured at 230° C. under a load of 2.16 kg according to ASTM D1238. If the melt index of the ethylene-propylene block copolymer (A) is less than 0.5 g/10 minutes, it is not suitable for the extrusion process. If it exceeds 20 g/10 minutes, the molecular weight is too small, thereby deteriorating the breakdown voltage characteristics.

When the ethylene-propylene block copolymer (A) is extracted at room temperature with a xylene solvent, the content of the rubber component (i.e., solvent extract) extracted may be 1 to 50% by weight, preferably 5 to 45% by weight. If the content of the rubber component is less than 1% by weight, the strength is high and the flexibility is low. If the content of the rubber component exceeds 50% by weight, the heat deformation rate is high, and the tensile and elongation strength is low. Thus, it is deteriorated in terms of thermal resistance and processability.

Here, the glass transition temperature (Tg) of the rubber component in the ethylene-propylene block copolymer (A) extracted by a xylene solvent appears at −60 to −40° C. when measured by a dynamic mechanical analyzer (DMA). In such a case, the low-temperature impact resistance measured at −40° C. is excellent.

In addition, the intrinsic viscosity of the rubber component in the ethylene-propylene block copolymer (A) extracted by a xylene solvent may be 1.0 to 3.0 dl/g when measured in a decalin solvent at 135° C. If the intrinsic viscosity is less than 1.0 dl/g, the impact strength is not good. If it exceeds 3.0 dl/g, the rubber component may agglomerate, and the area of the interface is reduced, so that space charges may be readily accumulated.

The polyolefin resin composition according to an embodiment of the present invention comprises 50 to 95% by weight of the ethylene-propylene block copolymer (A) based on the total weight of components (A) to (C). If the content of the ethylene-propylene block copolymer (A) exceeds 95%, the softness may be reduced, thereby deteriorating the flexibility. If the content is less than 50%, the thermal resistance is reduced, and the heat deformation characteristics are deteriorated, so that the deformation of appearance may be aggravated in the operation at high temperatures.

In the present invention, there is no particular limitation to the method of preparing the ethylene-propylene block copolymer (A). Any method of preparing an ethylene-propylene block copolymer known in the art to which the present invention pertains may be used as it is or as appropriately modified.

Preferably, the ethylene-propylene block copolymer resin may be prepared by a polymerization method known to those skilled in the art using Mitsui's Hypol process in which two bulk reactors and two gas-phase reactors are connected in series, and polymerization is continuously carried out therein.

Specifically, in the first- and second-stage reactors or in the first- to third-stage reactors, propylene alone is injected to produce a propylene homopolymer, or ethylene is additionally injected thereto to produce an ethylene-propylene random copolymer. In the case of polymerization of the ethylene-propylene random copolymer, the same amount of ethylene may be copolymerized in each polymerization reactor. In the fourth-stage reactor or in the third- and fourth-stage reactors, ethylene and propylene may be injected to polymerize an ethylene-propylene rubber, thereby obtaining the final ethylene-propylene block copolymer. The melt index of the resulting copolymer can be controlled by injecting hydrogen into each reactor.

In the above polymerization step, although a catalyst known in the art may be used without a limitation thereto, it is preferable to use a Ziegler-Natta catalyst. In such an event, the catalyst may be prepared by reacting a titanium compound with a phthalate-based internal electron donor on a dialkoxy magnesium carrier. Further, it is preferable to use an organoaluminum compound (e.g., triethylaluminum) as a co-catalyst and a dialkyldialkoxysilane-based compound (e.g., dicyclopentyldimethoxysilane) as an external electron donor.

(B) Ethylene-α-Olefin Rubber Copolymer

The polyolefin resin composition according to an embodiment of the present invention comprises an ethylene-α-olefin rubber copolymer (B).

The ethylene-α-olefin rubber copolymer (B) may be at least one selected from the group consisting of an ethylene-propylene rubber, an ethylene-1-butene rubber, an ethylene-butylene rubber, an ethylene-1-pentene rubber, an ethylene-1-hexene rubber, ethylene-1-heptene rubber, ethylene-1-octene rubber, and an ethylene-4-methyl-1-pentene rubber. Preferably, the ethylene-α-olefin rubber copolymer (B) may be an ethylene-propylene rubber.

The content of ethylene in the ethylene-α-olefin rubber copolymer (B) may be 5 to 90% by weight, preferably 5 to 80% by weight. Specifically, the content of ethylene is 5 to 90% by weight, preferably 5 to 80% by weight, when the ethylene-α-olefin rubber copolymer (B) is measured by a Fourier transform infrared spectrometer. If the content of ethylene is less than 5% by weight, the ethylene-α-olefin rubber is crystallized to reduce the low-temperature impact strength of the polyolefin resin composition. If the content of ethylene exceeds 90% by weight, a rubber copolymer is not obtained.

The polyolefin resin composition according to an embodiment of the present invention comprises 4.8 to 40% by weight of the ethylene-α-olefin rubber copolymer (B) based on the total weight of components (A) to (C). If the content of the ethylene-α-olefin rubber copolymer (B) is less than 4.8% by weight, the softness is not sufficiently improved. If it exceeds 40% by weight, the thermal resistance characteristics are rapidly deteriorated.

The ethylene-α-olefin rubber copolymer (B) may be polymerized by additionally feeding an olefin monomer in the presence of the ethylene-propylene block copolymer (A) in the gas-phase reactor(s) of the Hypol process.

In another method, a commercially available ethylene-α-olefin rubber copolymer (B) may be blended with the ethylene-propylene block copolymer (A) obtained in the Hypol process, thereby preparing the polyolefin resin composition of the present invention. Examples of the ethylene-α-olefin rubber copolymer (B) commercially available include Versify (Dow), Vistamaxx (ExxonMobil), Tafmer (Mitsui), KEP (Kumho Petrochemical), Engage (Dow), Exact (ExxonMobil), Lucene (LG Chemical), and Solumer (SK Chemical), but it is not limited thereto.

(C) Copolymer of Ethylene and a Polar Monomer

The polyolefin resin composition according to an embodiment of the present invention comprises a copolymer of ethylene and a polar monomer (C).

The polar monomer in the copolymer of ethylene and a polar monomer (C) may comprise at least one polar group selected from the group consisting of an acetate group, an acrylate group, a carboxylate group, and a ketone group, but it is not particularly limited thereto.

The copolymer of ethylene and a polar monomer (C) may be commercially available from Hanwha Total Petrochemical and Arkema, but it is not particularly limited thereto.

The polyolefin resin composition according to an embodiment of the present invention comprises 0.2 to 10% by weight of the copolymer of ethylene and a polar monomer (C) based on the total weight of components (A) to (C). If the content of the copolymer of ethylene and a polar monomer (C) is less than 0.2% by weight, traps that control the movement of electrons are not formed at the interface, whereby the volume resistivity and dielectric breakdown strength are not improved. If the content exceeds 10% by weight, the thermal resistance characteristics of a molded article are deteriorated.

Composition

There is no particular limitation to the method for producing the polyolefin resin composite according to an embodiment of the present invention. Any blending method known in the technical field of the present invention may be used as it is or appropriately modified.

As a specific example, the resins described above and the additives described below are supplied to a mixer such as a kneader, a roll, and a Banbury mixer, or a single- or twin-screw extruder in predetermined amounts, and they are then blended with this apparatus, thereby preparing the polyolefin resin composition of the present invention.

The polyolefin resin composition according to an embodiment of the present invention may have a melting temperature (Tm) of 145 to 170° C. If the melting temperature is lower than 145° C., the thermal resistance is not sufficient, so that the resin may be deformed by heat. Thus, it is not suitable to be applied as an insulator for a high-voltage, high-thermal resistant electric power device whose operation temperature and instantaneous temperature are raised to 130° C. or higher.

The polyolefin resin composition according to an embodiment of the present invention has a melt index of 0.5 to 20 g/10 min when measured at 230° C. under a load of 2.16 kg according to ASTM D1238. If the melt index is less than 0.5 g/10 minutes, the extrusion temperature and load increase, resulting in a lower productivity along with carbides. If it exceeds 20 g/10 minutes, a deflection of the extrudate occurs during extrusion, which is not preferable.

When the polyolefin resin composition according to an embodiment of the present invention is extracted at room temperature with a xylene solvent, the content of the rubber component (i.e., solvent extract) extracted may be 10 to 50% by weight, preferably 15 to 40% by weight. If the content of the rubber component is less than 10% by weight, the softness is reduced, which limits the installation of products. If it exceeds 50% by weight, the thermal resistance characteristics are deteriorated, so that it is not suitable as an insulator that requires high-temperature thermal resistance.

Here, the glass transition temperature (Tg) of the rubber component in the polyolefin resin composition according to an embodiment of the present invention extracted by a xylene solvent appears at −60 to −40° C. when measured by a dynamic mechanical analyzer (DMA). In such a case, the low-temperature impact resistance measured at −40° C. is excellent.

In addition, the intrinsic viscosity of the rubber component in the polyolefin resin composition according to an embodiment of the present invention extracted by a xylene solvent may be 1.0 to 3.0 dl/g when measured in a decalin solvent at 135° C. If the intrinsic viscosity is less than 1.0 dl/g, the impact strength is not good. If it exceeds 3.0 dl/g, the rubber component may agglomerate, and the area of the interface is reduced, so that traps that control the accumulation of space charges are not sufficiently formed.

The polyolefin resin composition according to an embodiment of the present invention may further comprise conventional additives within a range not departing from the scope of the present invention. For example, the polyolefin resin composition according to an embodiment of the present invention may further comprise at least one additive selected from the group consisting of an antioxidant, a neutralizer, a UV stabilizer, a long-term heat stabilizer, a slip agent, an anti-blocking agent, a reinforcement, a filler, a weathering stabilizer, an antistatic agent, a lubricant, a nucleating agent, a flame retardant, a pigment, and a dye, but it is not particularly limited thereto.

As a preferable embodiment, the polyolefin resin composition according to an embodiment of the present invention may further comprise an antioxidant to increase the thermal stability thereof.

Examples of the antioxidant include a phenolic antioxidant, a phosphite antioxidant, or the like. Specifically, it may be at least one selected from the group consisting of tetrakis(methylene(3,5-di-t-butyl-4-hydroxy)hydrosilylnate), pentaerythritol tetrakis(3-(3,5-di-t-butyl-4-hydroxyphenyl)propionate), 1,3,5-trimethyl-tris(3,5-di-t-butyl-4-hydroxybenzene), and tris(2,4-di-t-butylphenyl)phosphite, but it is not limited thereto.

As a preferable embodiment, the polyolefin resin composition according to an embodiment of the present invention may further comprise hydrotalcite, calcium stearate, or the like as a neutralizer for removing the catalyst residues.

Here, the content of the additive may be 0.5% by weight or less based on the total weight of the polyolefin resin composition.

Molded Article

According to another embodiment of the present invention, there is provided a polyolefin resin article molded from the polyolefin resin composition.

There is no particular limitation to the method for producing a molded article from the polyolefin resin composition according to an embodiment of the present invention. Any method known in the technical field of the present invention may be used. For example, the polyolefin resin composition according to an embodiment of the present invention may be molded by a conventional method such as injection molding, extrusion molding, casting molding, or the like to prepare a molded article of a polyolefin resin.

The polyolefin resin article according to an embodiment of the present invention may have a flexural modulus of 500 MPa or less and an impact strength of 5 kgf cm/cm or more at −40° C. If the flexural modulus exceeds 500 MPa, the softness decreases. If the impact strength measured at −40° C. is less than 5 kgf cm/cm, breakage may occur during installation and transportation in winter.

The polyolefin resin article according to an embodiment of the present invention may have an elongation of 400% or more, and the elongation measured after the same specimen is heated at 135° C. for 10 days may be 75% or more relative to the initial (before heating) elongation. If the elongation is less than 400%, breakage may occur at the outermost portion of a bend of the molded article.

The polyolefin resin article according to an embodiment of the present invention may have a volume resistivity of 1016 Ωcm or more, and the volume resistivity measured after the same specimen is heated at 135° C. for 10 days may be 1016 Ωcm or more. If the volume resistivity is within the above range, the molded article may serve as an insulator.

The polyolefin resin article according to an embodiment of the present invention may have a DC dielectric breakdown strength of 100 kV/mm or more, and the DC dielectric breakdown strength measured after the same specimen is heated at 135° C. for 10 days may be 100 kV/mm or more. If the DC dielectric breakdown strength is within the above range, the molded article is excellent in breakdown voltage characteristics, so that it may serve as an insulator.

The polyolefin resin article according to an embodiment of the present invention may be an insulator of a high-voltage power device.

EXAMPLE

Hereinafter, the present invention is explained in detail by the following examples. However, the following examples are intended to further illustrate the present invention. The scope of the present invention is not limited thereto only.

The resin components (A) to (C) used in the following examples and comparative examples were prepared or obtained in the following ways.

Example 1

An ethylene-propylene block copolymer (A) was prepared in the presence of the catalyst in the Hypol process as described above. Here, the operating temperatures and pressures of the bulk reactors as the first- and second-stage reactors were in the range of 68 to 75° C. and 30 to 40 kg/cm2, and 68 to 75° C. and 25 to 35 kg/cm2, respectively. The operating temperatures and pressures of the gas-phase reactors as the third- and fourth-stage reactors were in the range of 75 to 82° C. and 15 to 20 kg/cm2, and 68 to 75° C. and 10 to 17 kg/cm2, respectively. An ethylene-α-olefin rubber copolymer (B) having the composition shown in Table 1 was used.

As a copolymer of ethylene and a polar monomer (C), an ethylene-butyl acrylate polymer (Rothryl 17BA04 of Arkema) and an ethylene-vinyl acetate copolymer (Hanwha Total Petrochemical's E156W) were used, respectively.

Example 2

The contents of ethylene and propylene were changed under the same conditions as in Example 1 to obtain an ethylene-propylene block copolymer (A) having the composition of Table 1. An ethylene-octene rubber copolymer (B) and a copolymer of ethylene and a polar monomer (C) having the compositions shown in Table 1 were used.

Example 3

The contents of ethylene and propylene were changed under the same conditions as in Example 1 to obtain an ethylene-propylene block copolymer (A) having the composition of Table 1. An ethylene-propylene-octene rubber copolymer (B) and a copolymer of ethylene and a polar monomer (C) having the compositions shown in Table 1 were used.

Comparative Example 1

The same ethylene-propylene block copolymer (A) as in Example 1 was used, and an ethylene-propylene rubber copolymer (B) having the composition shown in Table 2 was used.

Comparative Example 2

The same ethylene-propylene block copolymer (A) as in Example 1 was used, and an ethylene-octene rubber copolymer (B) and a copolymer of ethylene and a polar monomer (C) having the compositions shown in Table 2 were used.

Comparative Example 3

Hanwha Total's ethylene-propylene random block copolymer CF335 was used as resin (A), and an ethylene-propylene-octene rubber copolymer (B) and a copolymer of ethylene and a polar monomer (C) having the compositions shown in Table 2 were used.

Comparative Example 4

Hanwha Total's ethylene-propylene random block copolymer CF330 was used as resin (A), and a copolymer of ethylene and a polar monomer (C) having the composition shown in Table 2 was used.

Comparative Example 5

The contents of ethylene and propylene were changed under the same conditions as in Example 2 to obtain an ethylene-propylene block copolymer (A) having the composition of Table 1. An ethylene-butene rubber copolymer (B) and a copolymer of ethylene and a polar monomer (C) having the compositions shown in Table 2 were used.

The physical properties of the compositions and the molded article specimens prepared in Examples 1 to 3 and Comparative Examples 1 to 5 were measured according to the following methods and standards. The results are shown in Tables 1 and 2 below.

(1) Melt Index

Melt index was measured at 230° C. under a load of 2.16 kg according to the ASTM D 1238 method.

(2) Content of a Solvent Extract (or Xylene Soluble)

A polypropylene resin was dissolved in xylene at a concentration of 1% at 140° C. for 1 hour and left at room temperature for 2 hours for extraction. The weight of the extract was measured and expressed in percent based on the total weight of the polypropylene resin.

(3) Intrinsic Viscosity of a Solvent Extract

The intrinsic viscosity of a solvent extract was measured in a decalin solvent at 135° C. using a viscometer.

(4) Melting Temperature

A sample was kept isothermal at 200° C. for 10 minutes in a differential scanning calorimeter (DSC; Q2000, TA Instrument) to remove the thermal history and then cooled from 200° C. to 30° C. at a rate of 10° C. per minute for crystallization thereof to impart the same thermal history. Then, the sample was kept isothermal at 30° C. for 10 minutes, followed by heating the sample at a rate of 10° C. per minute. The melting temperature (Tm) was obtained from the peak temperature.

(5) Glass Transition Temperature

In a dynamic mechanical analyzer (DMA; TA Instrument Q800), the temperature was raised from −140° C. to 145° C. at a rate of 2° C./min, and the glass transition temperature (Tg) of the rubber component was determined from the stress relaxation curve.

(6) Flexural Modulus (FM)

Flexural modulus was measured in accordance with the ASTM D 790 method. The size of the injection-molded specimen was 100 mm×10 mm×3 mm.

(7) Heat Deformation

A specimen having a length of 30 mm, a width of 15 mm, and a thickness of 2 mm was prepared by injection molding at 240° C. According to the KS C IEC 60811-508 method, a load of 1.6 kg was applied to the specimen at 130° C. for 6 hours, and the deformed thickness was measured. The deformation rate was obtained by dividing the deformed thickness by the initial thickness. If the heat deformation rate is less than 50%, it was evaluated as a pass. If the heat deformation rate is 50% or more, it was evaluated as a failure.

(8) Izod Impact Strength

Izod impact strength was measured at −40° C. in accordance with the ASTM D 256 method.

(9) Elongation at Break

Elongation at break was measured at 25 mm/min in accordance with the IEC 60811-501 method. For aging tests, the specimen was heated at 135° C. in a convection oven for 10 days, and the residual elongation was obtained by dividing this value by the initial elongation.

(10) Direct Current (DC) Breakdown Voltage

A polypropylene specimen was prepared as a sheet having a thickness of 200 μm using a laboratory extruder (HAAKE extruder). A crosslinked polyethylene (XLPE) specimen having a thickness of 200 μm was prepared by press molding at 180° C. Direct current breakdown voltage was measured at room temperature using spherical electrodes having a diameter of 12.7 mm according to the ASTM D 149-92 method. For aging tests, the specimen was heated at 135° C. in a convection oven for 10 days, and the DC breakdown voltage was measured.

(11) Volume Resistivity

A standard injection-molded specimen of 10 cm×10 cm×2 mm was prepared at an injection temperature of 240° C., which was heated at room temperature for 2 days, and the volume resistivity was then measured according to ASTM D257. For aging tests, the specimen was heated at 135° C. in a convection oven for 10 days, and the volume resistivity was measured.

TABLE 1

| | | Example | | |
|---|---|---|---|---|
| | | 1 | 2 | 3 |
| Resins of the composition | Component (A): | 85 | 75 | 84 |
| | Propylene content (wt. %) | 90 | 85 | 90 |
| | Ethylene content (wt. %) | 10 | 15 | 10 |
| | Melting temp. (Tm; ° C.) | 151 | 153 | 161 |
| | Melt index (g/10 min) | 3 | 2 | 15 |
| | Solvent extract content (wt. %) | 25 | 32 | 26 |
| | Glass transition temperature of the solvent extract (° C.) | −53 | −51 | −49 |
| | Intrinsic viscosity of the solvent extract (dl/g) | 2.8 | 2.9 | 2.2 |
| | Component (B): | 14 | 20 | 15 |
| | Propylene content (wt. %) | 85 | — | 85 |
| | Ethylene content (wt. %) | 15 | 60 | 10 |
| | Octene content (wt. %) | — | 40 | 5 |
| | Butene content (wt. %) | — | — | — |
| | Component (C): | 1 | 5 | 1 |
| | Ethylene-butyl acrylate | ○ | ○ | — |
| | Ethylene-vinyl acetate | — | — | ○ |
| Properties of the composition | Melt index (g/10 min, 230° C.) | 2.0 | 5.0 | 10.0 |
| | Solvent extract content (wt. %) | 35 | 39 | 34 |
| | Intrinsic viscosity of the solvent extract (dl/g) | 2.0 | 2.3 | 1.5 |
| | Thermal behavior: | | | |
| | Melting temp. (Tm; ° C.) | 152 | 151 | 161 |
| | Glass transition temperature #1 (° C.) | −31 | −30 | −33 |
| | Glass transition temperature #2 (° C.) | −53 | −52 | −48 |
| Properties of the molded article | Flexural modulus (MPa) | 350 | 430 | 380 |
| | Heat deformation (%) | 21 | 24 | 14 |
| | Izod impact strength (kgf cm/cm) | 9 | NB | 6 |
| | Elongation at break (%) | 490 | 520 | 480 |
| | Residual elongation (%) | 90 | 88 | 85 |
| | Volume resistivity (Ωcm) | $3 \times 10^{16}$ | $1 \times 10^{16}$ | $1 \times 10^{17}$ |
| | Volume resistivity upon aging (Ωcm) | $4 \times 10^{16}$ | $2 \times 10^{16}$ | $2 \times 10^{17}$ |
| | DC breakdown voltage (kV/mm) | 121 | 112 | 127 |
| | Breakdown voltage upon aging (kV/mm) | 119 | 103 | 131 |

TABLE 2

|  |  | Comparative Example | | | | |
| --- | --- | --- | --- | --- | --- | --- |
|  |  | 1 | 2 | 3 | 4 | 5 |
| Resins of the composition | Component (A): | 85 | 85 | 75 | 90 | 50 |
|  | Propylene content (wt. %) | 90 | 90 | 85 | 90 | 80 |
|  | Ethylene content (wt. %) | 10 | 10 | 15 | 10 | 20 |
|  | Melting temp. (Tm; °C.) | 151 | 151 | 161 | 161 | 151 |
|  | Melt index (g/10 min) | 3 | 3 | 7 | 10 | 2 |
|  | Solvent extract content (wt. %) | 25 | 25 | 32 | 25 | 40 |
|  | Glass transition temperature of the solvent extract (°C.) | −53 | −53 | −51 | −53 | −53 |
|  | Intrinsic viscosity of the solvent extract (dl/g) | 2.8 | 2.7 | 2.9 | 2.8 | 3.4 |
|  | Component (B): | 15 | 14.9 | 10 | — | 40 |
|  | Propylene content (wt. %) | 85 | — | 85 | — | — |
|  | Ethylene content (wt. %) | 15 | 60 | 10 | — | 90 |
|  | Octene content (wt. %) | — | 40 | 5 | — | — |
|  | Butene content (wt. %) | — | — | — | — | 10 |
|  | Component (C): | — | 0.1 | 15 | 10 | 10 |
|  | Ethylene-butyl acrylate | — | ○ | ○ | — | ○ |
|  | Ethylene-vinyl acetate | — | — | — | ○ | — |
| Properties of the composition | Melt index (g/10 min, 230° C.) | 2.1 | 5.0 | 1.3 | 9.0 | 4.3 |
|  | Solvent extract content (wt. %) | 35 | 36 | 40 | 18 | 63 |
|  | Intrinsic viscosity of the solvent extract (dl/g) | 1.9 | 2.4 | 5.2 | 2.7 | 2.1 |
|  | Thermal behavior: |  |  |  |  |  |
|  | Melting temp. (Tm; °C.) | 153 | 152 | 162 | 163 | 151 |
|  | Glass transition temperature #1 (°C.) | −30 | — | −30 | −28 | −30 |
|  | Glass transition temperature #2 (°C.) | −53 | −51 | −54 | — | −52 |
| Properties of the molded article | Flexural modulus (MPa) | 330 | 520 | 480 | 700 | 160 |
|  | Heat deformation (%) | 20 | 18 | 17 | 4 | 85 |
|  | Izod impact strength (kgf cm/cm) | 8 | NB | 12 | 3 | NB |
|  | Elongation at break (%) | 460 | 430 | 310 | 440 | 520 |
|  | Residual elongation (%) | 88 | 90 | 92 | 94 | 62 |
|  | Volume resistivity (Ωcm) | $6 \times 10^{15}$ | $4 \times 10^{15}$ | $6 \times 10^{14}$ | $1 \times 10^{17}$ | $3 \times 10^{14}$ |
|  | Volume resistivity upon aging (Ωcm) | $2 \times 10^{16}$ | $9 \times 10^{15}$ | $2 \times 10^{14}$ | $2 \times 10^{17}$ | $7 \times 10^{13}$ |
|  | DC breakdown voltage (kV/mm) | 107 | 98 | 111 | 103 | 82 |
|  | Breakdown voltage upon aging (kV/mm) | 112 | 92 | 82 | 92 | 61 |

In Tables 1 and 2 above, the glass transition temperature of component (A) indicates the glass transition temperature of the rubber component present in the ethylene-propylene block copolymer (A), and the glass transition temperature of the composition (in the thermal behavior item) indicates the glass transition temperature of the rubber component present in the composition. The glass transition temperature #2 of the composition is understood as a factor that affects the impact strength of the polyolefin resin composition according to an embodiment of the present invention, along with the glass transition temperature of the rubber component in the ethylene-propylene block copolymer (A). The glass transition temperature #1 of the composition is a glass transition temperature appearing by the impact of component (B), which is understood not to affect the impact strength of the polyolefin resin composition.

As confirmed from the above tables, the polyolefin resin compositions obtained in the Examples, falling within the scope of the present invention, had a low flexural modulus showing softness, high impact strength, and excellent insulation characteristics. In particular, the resin compositions of the Examples were excellent in thermal resistance, so that the change in physical properties measured after aging at high temperatures for a long period of time was not significant.

In contrast, the compositions of Comparative Examples 1 to 3 had low insulation resistance and low DC dielectric breakdown strength, so that a thick insulator must be formed when used as an insulator, which is not preferable. The compositions of Comparative Examples 4 and 5 had poor thermal resistance, whereby the physical properties were rapidly deteriorated upon aging at high temperatures.

The polyolefin resin composition according to an embodiment of the present invention is excellent in impact resistance, heat deformation resistance, and mechanical properties and is good in electrical properties, which makes it suitable as a direct current insulator. Since it is not cross-linked and thus recyclable, it is environmentally friendly.

What is claimed is:
1. A polyolefin resin composition, which comprises:
(A) 50 to 95% by weight of an ethylene-propylene block copolymer obtained by polymerization of a propylene homopolymer or an ethylene-propylene random copolymer with an ethylene-propylene rubber copolymer in stages in reactors;
(B) 4.8 to 40% by weight of an ethylene-α-olefin rubber copolymer; and
(C) 0.2 to 10% by weight of a copolymer of ethylene and a polar monomer, based on the total weight of components (A) to (C),
wherein the glass transition temperature of the rubber component in the ethylene-propylene block copolymer appears at −60 to −40° C. when measured by a dynamic mechanical analyzer, the melt index of the polyolefin resin composition measured at 230° C. under a load of 2.16 kg is 0.5 to 20 g/10 minutes, and the glass transition temperature of the rubber component in the polyolefin resin composition appears at −60 to −40° C. when measured by a dynamic mechanical analyzer.

2. The polyolefin resin composition of claim 1, wherein the ethylene-propylene block copolymer (A) has a melting temperature (Tm) of 145 to 170° C.

3. The polyolefin resin composition of claim 1, wherein the ethylene-propylene block copolymer (A) has a melt index of 0.5 to 20 g/10 minutes when measured at 230° C. under a load of 2.16 kg.

4. The polyolefin resin composition of claim 1, wherein when the ethylene-propylene block copolymer (A) is extracted at room temperature with a xylene solvent, the content of the rubber component extracted is 1 to 50% by weight.

5. The polyolefin resin composition of claim 4, wherein the intrinsic viscosity of the rubber component extracted by the xylene solvent is 1.0 to 3.0 dl/g when measured in a decalin solvent at 135° C.

6. The polyolefin resin composition of claim 1, wherein the ethylene-α-olefin rubber copolymer (B) is at least one selected from the group consisting of an ethylene-propylene rubber, an ethylene-1-butene rubber, an ethylene-butylene rubber, an ethylene-1-pentene rubber, an ethylene-1-hexene rubber, ethylene-1-heptene rubber, ethylene-1-octene rubber, and an ethylene-4-methyl-1-pentene rubber.

7. The polyolefin resin composition of claim 1, wherein the content of ethylene in the ethylene-α-olefin rubber copolymer (B) is 5 to 90% by weight.

8. The polyolefin resin composition of claim 1, wherein the polar monomer in the copolymer of ethylene and a polar monomer (C) comprises at least one polar group selected from the group consisting of an acetate group, an acrylate group, a carboxylate group, and a ketone group.

9. The polyolefin resin composition of claim 1, wherein when the polyolefin resin composition is extracted at room temperature with a xylene solvent, the content of the rubber component extracted is 10 to 50% by weight.

10. The polyolefin resin composition of claim 9, wherein the intrinsic viscosity of the rubber component extracted by the xylene solvent is 1.0 to 3.0 dl/g when measured in a decalin solvent at 135° C.

11. The polyolefin resin composition of claim 1, which has a melting temperature (Tm) of 145 to 170° C.

12. The polyolefin resin composition of claim 1, which further comprises at least one additive selected from the group consisting of an antioxidant, a neutralizer, a UV stabilizer, a long-term heat stabilizer, a slip agent, an anti-blocking agent, a reinforcement, a filler, a weathering stabilizer, an antistatic agent, a lubricant, a nucleating agent, a flame retardant, a pigment, and a dye.

13. The polyolefin resin composition of claim 12, wherein the content of the additive is 0.5% by weight or less based on the total weight of the polyolefin resin composition.

14. A polyolefin resin article molded from the polyolefin resin composition according to claim 1.

15. The polyolefin resin article of claim 14, which has a flexural modulus of 500 MPa or less and an Izod impact strength at −40° C. of 5 kgf cm/cm or more.

16. The polyolefin resin article of claim 14, which has an elongation of 400% or more, wherein the elongation measured after the same specimen is heated at 135° C. for 10 days is 75% or more relative to the initial (before heating) elongation.

17. The polyolefin resin article of claim 14, which has a volume resistivity of $10^{16}$ Ωcm or more, wherein the volume resistivity measured after the same specimen is heated at 135° C. for 10 days is $10^{16}$ Ωcm or more.

18. The polyolefin resin article of claim 14, which has a dielectric breakdown strength of 100 kV/mm or more, wherein the dielectric breakdown strength measured after the same specimen is heated at 135° C. for 10 days is 100 kV/mm or more.

19. The polyolefin resin article of claim 14, which is an insulator of a high-voltage power device.

* * * * *